(12) United States Patent
Tanabe et al.

(10) Patent No.: US 12,463,340 B2
(45) Date of Patent: Nov. 4, 2025

(54) PHASED ARRAY ANTENNA MODULE

(71) Applicant: Fujikura Ltd., Tokyo (JP)

(72) Inventors: Hiroyuki Tanabe, Sakura (JP); Ken Sakuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 66 days.

(21) Appl. No.: 18/663,905

(22) Filed: May 14, 2024

(65) Prior Publication Data

US 2024/0387990 A1   Nov. 21, 2024

(30) Foreign Application Priority Data

May 19, 2023 (JP) ................................ 2023-083116

(51) Int. Cl.
*H01Q 3/34* (2006.01)
*H01Q 21/00* (2006.01)
*H01Q 23/00* (2006.01)

(52) U.S. Cl.
CPC ........... *H01Q 3/34* (2013.01); *H01Q 21/0006* (2013.01); *H01Q 23/00* (2013.01)

(58) Field of Classification Search
CPC ....... H01Q 3/34; H01Q 21/0006; H01Q 23/00
See application file for complete search history.

(56) References Cited

U.S. PATENT DOCUMENTS

| | | | | |
|---|---|---|---|---|
| 5,821,901 | A * | 10/1998 | Zagrodnick | H01Q 3/2605 342/368 |
| 10,750,377 | B1 * | 8/2020 | Zihir | H04W 16/28 |
| 11,811,146 | B2 * | 11/2023 | Hormis | H04B 1/04 |
| 12,386,035 | B2 * | 8/2025 | Schmid | G01S 13/003 |
| 2010/0265998 | A1 * | 10/2010 | Nakada | H01Q 23/00 375/219 |
| 2021/0159594 | A1 * | 5/2021 | Tiebout | H01Q 5/385 |
| 2022/0352921 | A1 * | 11/2022 | Kim | H04B 1/401 |
| 2023/0327335 | A1 * | 10/2023 | Park | H01Q 21/065 342/372 |
| 2024/0213669 | A1 * | 6/2024 | Wang | H04B 7/0617 |
| 2024/0266737 | A1 * | 8/2024 | Pace | H01Q 3/38 |
| 2025/0253543 | A1 * | 8/2025 | Taher | H01Q 21/061 |

FOREIGN PATENT DOCUMENTS

| | | | | |
|---|---|---|---|---|
| JP | 2001-308627 | A | 11/2001 | |
| WO | WO-2025034212 | A1 * | 2/2025 | ............ H04B 1/04 |
| WO | WO-2025034213 | A1 * | 2/2025 | ......... H04B 7/0617 |

\* cited by examiner

*Primary Examiner* — Seokjin Kim
(74) *Attorney, Agent, or Firm* — WHDA, LLP (57) ABSTRACT

A phased array antenna module includes an analog circuit portion that adjusts at least one of an intensity and a phase of a signal transmitted or received by each of a plurality of antenna elements, a digital control portion that controls the analog circuit portion, a strobe mechanism portion that is provided between the analog circuit portion and the digital control portion, latches a control signal output from the digital control portion when a strobe latch signal is input, and outputs the control signal to the analog circuit portion, a state determination portion that determines whether or not the control signal is in a fixed state, and a timing adjustment portion that outputs the strobe latch signal to the strobe mechanism portion when a ready signal is output from the state determination portion.

9 Claims, 8 Drawing Sheets

| BY1 | BY2 | RD |
|---|---|---|
| 0 | 0 | 1 |
| 0 | 1 | 0 |
| 1 | 0 | 0 |
| 1 | 1 | 0 |

PHASED ARRAY ANTENNA MODULE

CROSS-REFERENCE TO RELATED APPLICATION

Priority is claimed on Japanese Patent Application No. 2023-083116, filed May 19, 2023, the content of which is incorporated herein by reference.

BACKGROUND OF THE INVENTION

Field of the Invention

The present invention relates to a phased array antenna module.

Description of Related Art

In a phased array antenna, a beam pattern (antenna directivity) can be changed freely by adjusting at least one of intensities and phases of signals (transmission signals) supplied to a plurality of antenna elements or signals (reception signals) supplied from the plurality of antenna elements. In recent years, such phased array antennas have been used in various fields such as automotives, communications, and others.

Japanese Unexamined Patent Application, First Publication No. 2001-308627 discloses a phased array antenna module in the related art. The phased array antenna module includes a plurality of antenna elements (phased array antennas), a plurality of phase controllers corresponding to the plurality of antenna elements, and a circuit to set setting values of phases for the plurality of phase controllers. In addition to this, there is a case where an intensity controller corresponding to the plurality of antenna elements is provided. A desired beam pattern is to be formed by setting appropriate setting values in the phase controller and the intensity controller and adjusting phases and intensities of a plurality of signals supplied from the plurality of antenna elements (or to the plurality of antenna elements).

In a phased array antenna module, the switching of transmission and reception, the switching of beam patterns, or the like is controlled by a control command transmitted from a host controller. It is desirable that a time (transition time TR) required for a state transition of the phased array antenna module is short. However, when a mechanism similar to a strobe mechanism disclosed in Japanese Unexamined Patent Application, First Publication No. 2001-308627 is used, a latency (delay) of a circuit provided in the phased array antenna module is included in the transition time TR, and contributes to the lengthening of the transition time TR.

As the above latency, a latency of a decoding circuit that converts a bit string of digital information stored in a register into control information corresponding to control terminals of various analog elements is an exemplary example. In addition, there is a read latency when data is read from a static random access memory (SRAM) used as a look-up table (LUT).

In addition, when a select signal is used to select a module of a control target from a plurality of modules provided in the phased array antenna module, a transmission timing of the select signal and a transmission timing of a strobe latch signal need to be adjusted. In this manner, in the related art, there are restrictions on a timing at which a host controller transmits the strobe latch signal to the phased array antenna module.

The present invention has been made in view of the above circumstances, and an object of the present invention is to provide a phased array antenna module capable of shortening a transition time and also eliminating restrictions on timing of transmitting a strobe latch signal.

SUMMARY OF THE INVENTION

A phased array antenna module (1 and 2) according to a first aspect of the present invention includes an analog circuit portion (13) that adjusts at least one of an intensity and a phase of a signal transmitted or received by each of a plurality of antenna elements (21), a digital control portion (17) that controls the analog circuit portion, a strobe mechanism portion (12) that is provided between the analog circuit portion and the digital controller, latches a control signal (CS1) output from the digital controller when an instruction signal (SL2 and SL3) indicating a strobe latch operation is input, and outputs the control signal to the analog circuit portion, a state determination portion (18) that determines whether or not the control signal is in a fixed state, and a timing adjustment portion (19 and 19AA) that outputs the instruction signal to the strobe mechanism portion when the instruction signal is input and a determination signal (RD) output from the state determination portion indicates that the control signal is in a fixed state.

In the phased array antenna module according to the first aspect of the present invention, the strobe mechanism portion is provided between the digital controller and the analog circuit portion, and the strobe mechanism portion latches and outputs the control signal to the analog circuit portion at a timing at which the control signal output from the digital controller is fixed. As a result, a time from a transmission start to a transmission end of a control command CM can be excluded from a transition time required for switching a beam pattern, and the transition time required for switching the beam pattern can be shortened.

In addition, in the phased array antenna module according to the first aspect of the present invention, when it is determined whether or not the control signal is in the fixed state, and the determination result indicates that the control signal is in the fixed state, a strobe latch signal is output to the strobe mechanism portion. As a result, it is possible to eliminate restrictions on timing at which the strobe latch signal is transmitted.

In the phased array antenna module according to a second aspect of the present invention further includes an interface portion (16) that receives a control command transmitted from an outside and outputs the control command to the digital controller, in which the state determination portion determines whether or not the control signal is in a fixed state, based on a state of the interface portion and a state of the digital controller, in the phased array antenna module according to the first aspect of the present invention.

In the phased array antenna module according to a third aspect of the present invention, the interface portion outputs a first busy signal (BY1) indicating a busy state when the control command is received, and releases the first busy signal when a process of outputting the control command to the digital controller is completed, the digital controller outputs a second busy signal (BY2) indicating a busy state when the first busy signal output from the interface portion is input, and releases the second busy signal when the control signal is in a fixed state, and the state determination portion determines that the control signal is in a fixed state, when both the first busy signal and the second busy signal are released, in the phased array antenna module according to the second aspect of the present invention.

In the phased array antenna module according to a fourth aspect of the present invention, the timing adjustment portion includes a latch circuit (19b) that latches the instruction signal, and outputs the instruction signal latched by the latch circuit to the strobe mechanism portion when the determination signal output from the state determination portion indicates that the control signal is in a fixed state in the phased array antenna module according to any one of the first to third aspect of the present invention.

In the phased array antenna module according to a fifth aspect of the present invention, the timing adjustment portion outputs the instruction signal latched by the latch circuit to the strobe mechanism portion, and then clears the latch circuit in the phased array antenna module according to the fourth aspect of the present invention.

According to the present invention, there is an effect that a transition time can be shortened and a restriction on a timing of transmitting a strobe latch signal can also be eliminated.

DETAILED DESCRIPTION OF THE INVENTION

Hereinafter, a phased array antenna module according to embodiments of the present invention will be described in detail with reference to the drawings.

First Embodiment

A phased array antenna module according to a first embodiment of the present invention is provided, for example, in a wireless communicator that uses a millimeter wave band and is capable of performing beamforming in which a beam pattern can be freely changed. The phased array antenna module has, for example, a plurality of integrated circuits (IC) mounted on one surface of a board such as a printed circuit board in the related art, and an antenna array mounted on the other surface.

The plurality of ICs and the antenna array that constitute the phased array antenna module are formed by using a material in the related art and by using a method in the related art. In addition, the electrical connection structure between the plurality of ICs and the electrical connection structure between the IC and the antenna array are not particularly limited. As the electrical connection structure, a connection structure in the related art is adopted.

<Phased Array Antenna Module>

Figure 1:
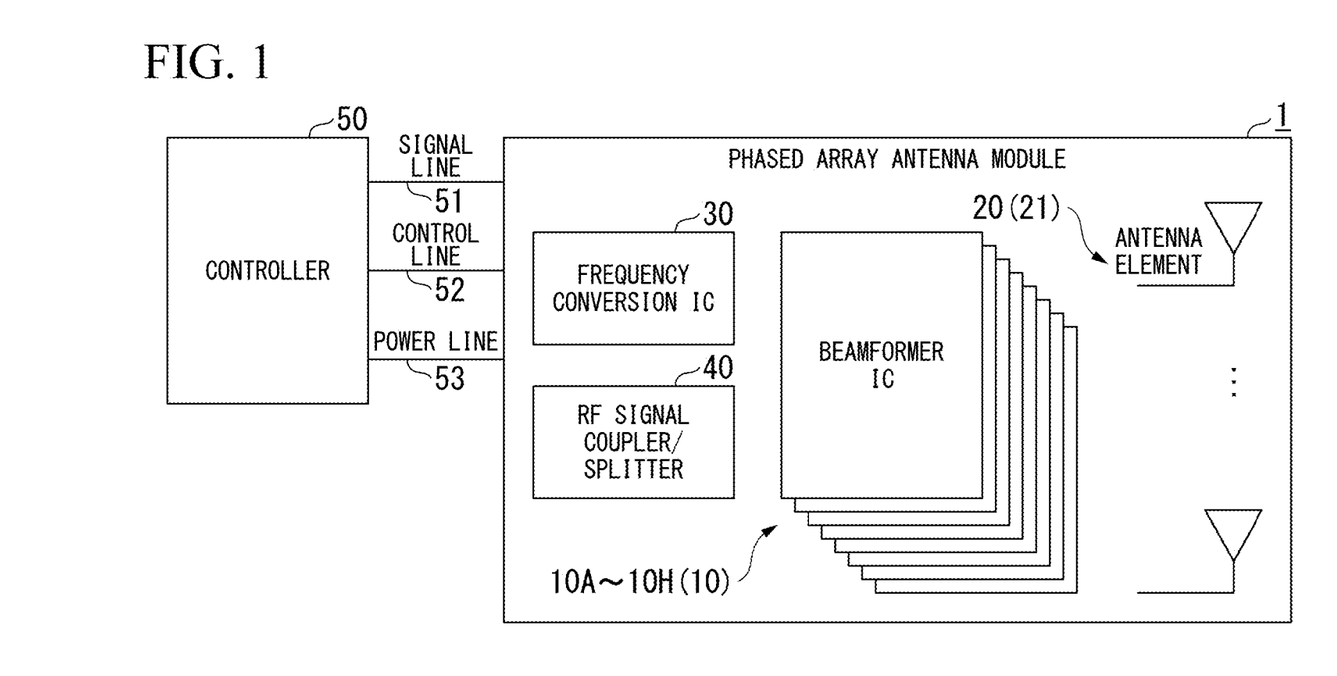
FIG. 1 is a system configuration diagram showing a configuration of a phased array antenna module according to a first embodiment of the present invention.

FIG. 1 is a system configuration diagram showing a configuration of the phased array antenna module according to the first embodiment of the present invention. As shown in FIG. 1, a phased array antenna module 1 includes 8 beamformer ICs 10A, 10B, 10C, 10D, 10E, 10F, 10G, and 10H (hereinafter, referred to as the beamformer ICs 10A to 10H), an antenna array 20, a frequency conversion IC 30, and an RF signal coupler/splitter 40.

The phased array antenna module 1 is connected to a controller 50 via a signal line 51, a control line 52, and a power line 53. Transmission and reception of an RF signal having an intermediate frequency (IF) are performed between the controller 50 and the phased array antenna module 1 via the signal line 51. Transmission and reception of a communication message related to the control via the control line 52 are performed between the controller 50 and the phased array antenna module 1. Power is supplied from the controller 50 to the phased array antenna module 1 via the power line 53.

The beamformer ICs 10A to 10H are ICs that control beam patterns of the antenna array 20. A plurality of antenna elements 21 constituting the antenna array 20 are connected to each of the beamformer ICs 10A to 10H. For example, each of the beamformer ICs 10A to 10H is connected to the 8 antenna elements 21 for horizontal polarization and the 8 antenna elements 21 for vertical polarization. That is, the antenna array 20 is configured with a total of the 128 antenna elements 21, which are the 64 antenna elements 21 for horizontal polarization and the 64 antenna elements 21 for vertical polarization. Details of the beamformer ICs 10A to 10H will be described later.

The frequency conversion IC 30 is an IC that performs a frequency conversion between the RF signal having the IF signal frequency and the RF signal having a frequency transmitted and received by the beamformer ICs 10A to 10H and the antenna array 20. The beamformer ICs 10A to 10H and the frequency conversion IC 30 are realized by, for example, an application specific integrated circuit (ASIC).

The RF signal coupler/splitter 40 distributes the RF signal output from the frequency conversion IC 30 to each of the beamformer ICs 10A to 10H. In addition, the RF signal coupler/splitter 40 couples the RF signal received by each of the beamformer ICs 10A to 10H and inputs the combined RF signal to the frequency conversion IC 30.

<Beamformer IC>

Figure 2:
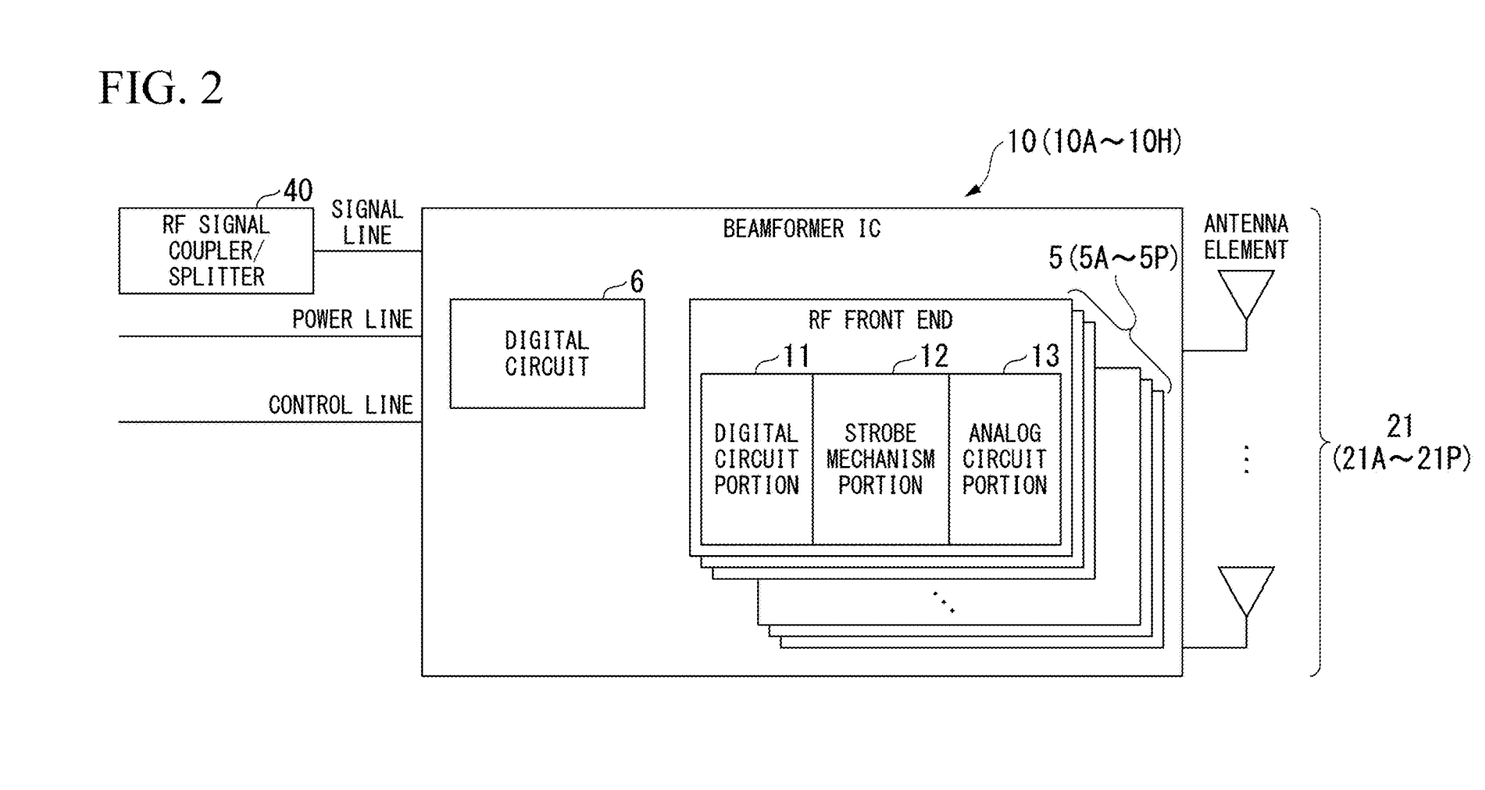
FIG. 2 is a block diagram showing a main configuration of a beamformer IC provided in the phased array antenna module according to the first embodiment of the present invention.

FIG. 2 is a block diagram showing a main configuration of the beamformer IC provided in the phased array antenna module according to the first embodiment of the present invention. The 8 beamformer ICs 10A to 10H have the same configuration as each other. Therefore, in the following description, there is a case where one of the beamformer ICs 10A to 10H, that is, a beamformer IC 10 will be described. The description of the other 7 beamformer ICs may be omitted.

The beamformer IC 10 includes 16 RF front ends 5A to 5P and a digital circuit 6. The 16 RF front ends 5A to 5P have the same configuration as each other. Therefore, in the following description, there is a case where one of the 16 RF front ends 5A to 5P, that is, an RF front end 5 will be described. The description of the other 15 RF front ends may be omitted.

In the one beamformer IC 10 shown in FIG. 2, each of the 16 RF front ends 5A to 5P is connected to respective one of 16 antenna elements 21A to 21P such that the one antenna element 21 corresponds to the one RF front end 5 on a one-to-one basis. Among the 16 antenna elements 21A to 21P, 8 antenna elements (for example, the antenna elements 21A to 21H) are antenna elements for horizontal polarization, and the remaining 8 antenna elements (for example, the antenna elements 211 to 21P) are antenna elements for vertical polarization.

The 16 antenna elements 21A to 21P have the same configuration or a similar configuration to each other. Therefore, in the following description, one of the 16 antenna elements 21A to 21P, that is, the antenna element 21 may be described. The description of the other 15 antenna elements may be omitted. The antenna elements 21A to 21P may have the same configuration as each other. Regarding the configuration of each of the antenna elements 21A to 21P, the configuration of the antenna element for horizontal polarization and the configuration of the antenna element for vertical polarization may be slightly different.

In this manner, in the one beamformer IC 10, each of the 16 RF front ends 5A to 5P is connected to respective one of the 16 antenna elements 21A to 21P on a one-to-one basis. Therefore, in the entire phased array antenna module 1 having the 8 beamformer ICs 10A to 10H, each of the 128 antenna elements 21 constituting the antenna array 20 is connected to respective one of the 16 RF front ends 5A to 5P in each of the 8 beamformer ICs 10A to 10H.

The 128 antenna elements 21 constituting the antenna array 20 are divided into the 64 antenna elements 21 that transmit or receive radio waves of horizontal polarization and the 64 antenna elements 21 that transmit or receive radio waves of vertical polarization. The 8 beamformer ICs 10A to 10H control transmission and reception of the radio waves of horizontal polarization in the 64 antenna elements 21, and control transmission and reception of the radio waves of vertical polarization in the 64 antenna elements 21. For each of the radio waves of horizontal polarization and the radio waves of vertical polarization, the beamformer ICs 10A to 10H set the gain and the phase of each of the 64 antenna elements 21 such that the direction of the combined radio waves transmitted or received from the 64 antenna elements 21 is a predetermined direction.

As shown in FIG. 2, the RF front end 5 includes a digital circuit portion 11, a strobe mechanism portion 12, and an analog circuit portion 13. The digital circuit portion 11 transmits and receives communication messages related to the control to and from the controller 50 via the control line 52 shown in FIG. 1. The digital circuit portion 11 controls the RF front end 5 based on the communication message transmitted from the controller 50.

In the present embodiment, the transmission and reception of communication message related to the control are performed by the parallel communication between the phased array antenna module 1 and the controller 50. That is, the digital circuit portion 11 transmits and receives the communication message related to the control by parallel communication with the controller 50. The communication performed between the phased array antenna module 1 and the controller 50 is not limited to parallel communication and may be a serial communication.

One communication transaction transmitted from the controller 50 to the phased array antenna module 1 includes additional information, a command, and data. The communication transaction has a fixed bit length. The command is a register address in a case of instructing to write into or read from the register. Alternatively, the command is a numerical value indicating an operation instruction to the beamformer IC 10 or the RF front end 5. A command or data has a fixed length. In the present embodiment, the command is 8 bits and the data is 8 bits.

The digital circuit portion 11 includes a storage region (not shown) for storing a beam table used for beamforming. The beam table is a look-up table that stores a plurality of combinations of phase shift amount setting values and gain setting values that are set according to the beam pattern of the antenna array 20 to be controlled. In the present embodiment, a beam table (beam table of 1024 items) in which 1024 combinations of the phase shift amount setting value and the gain setting value are defined is stored in the storage region. The beam table is written into the storage region or is read from the storage region by using a 10-bit address.

The storage region is realized using, for example, a static random access memory (SRAM). The storage region is preferably realized using SRAM, but may be realized using a register or may be realized using dynamic random access memory (DRAM), a flash memory, or a read only memory (ROM).

Figure 4:
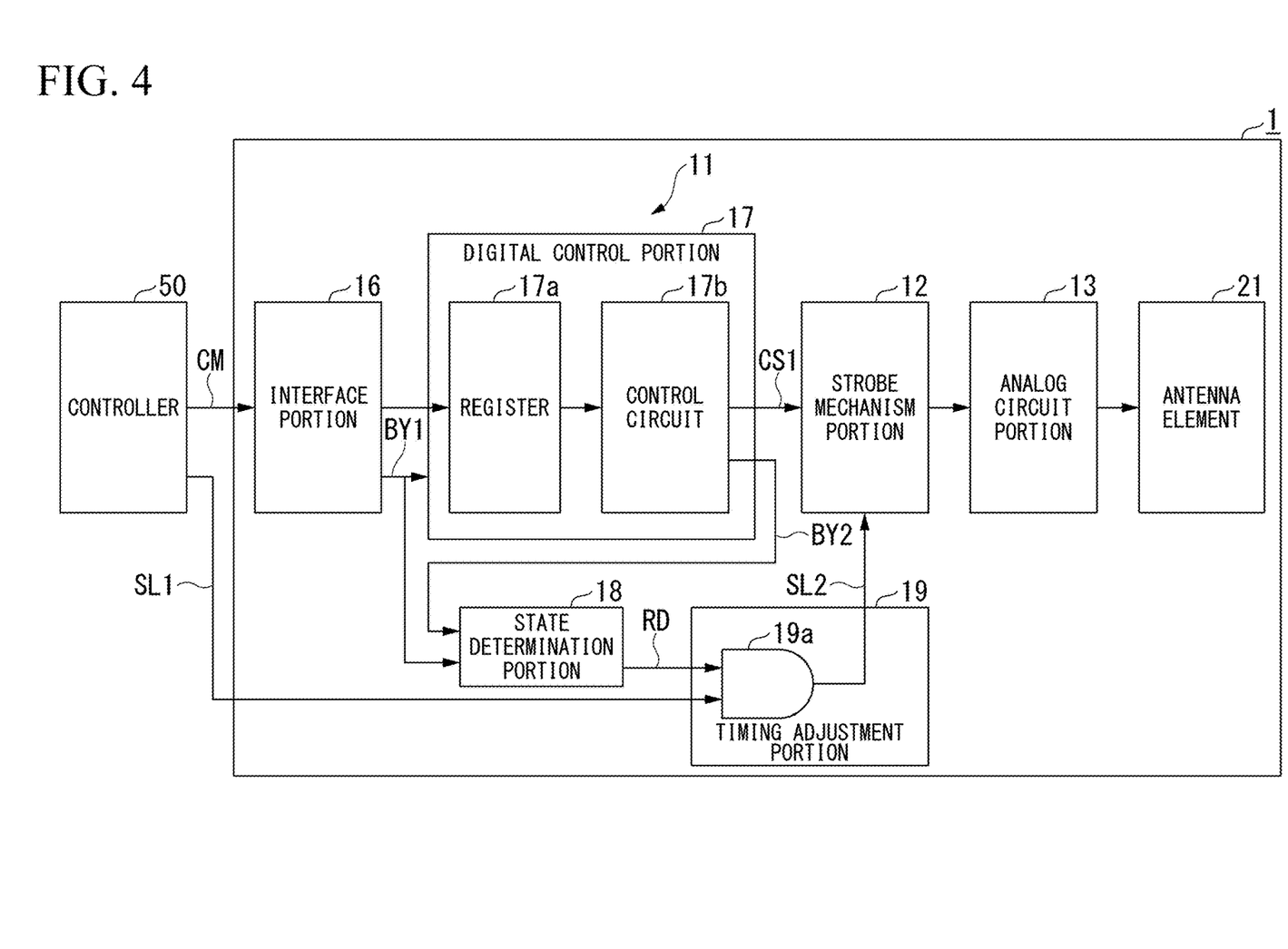
FIG. 4 is a block diagram extracting and summarizing a main configuration of the phased array antenna module according to the first embodiment of the present invention.

The digital circuit portion 11 includes an interface portion 16, a digital controller 17, a state determination portion 18, and a timing adjustment portion 19, in addition to the above storage region (see FIG. 4). The details of these will be described later.

The strobe mechanism portion 12 is provided between the digital circuit portion 11 and the analog circuit portion 13 and latches the control signal output from the digital circuit portion 11 when a strobe latch signal (instruction signal) indicating a strobe latch operation is input. The strobe mechanism portion 12 is provided in order to exclude the latency of, for example, the digital circuit portion 11 or the like, from a transition time TR, which is the time required for a state transition of the phased array antenna module 1, to shorten the transition time TR. The details of the strobe mechanism portion 12 will be described later.

The analog circuit portion 13 is a circuit that outputs an RF signal to the antenna element 21 connected to the RF front end 5 or receives an RF signal output from the antenna element 21. The analog circuit portion 13 adjusts the gain and the phase of the RF signal transmitted or received by the antenna element 21 connected to the RF front end 5 under the control of the digital circuit portion 11.

Figure 3:
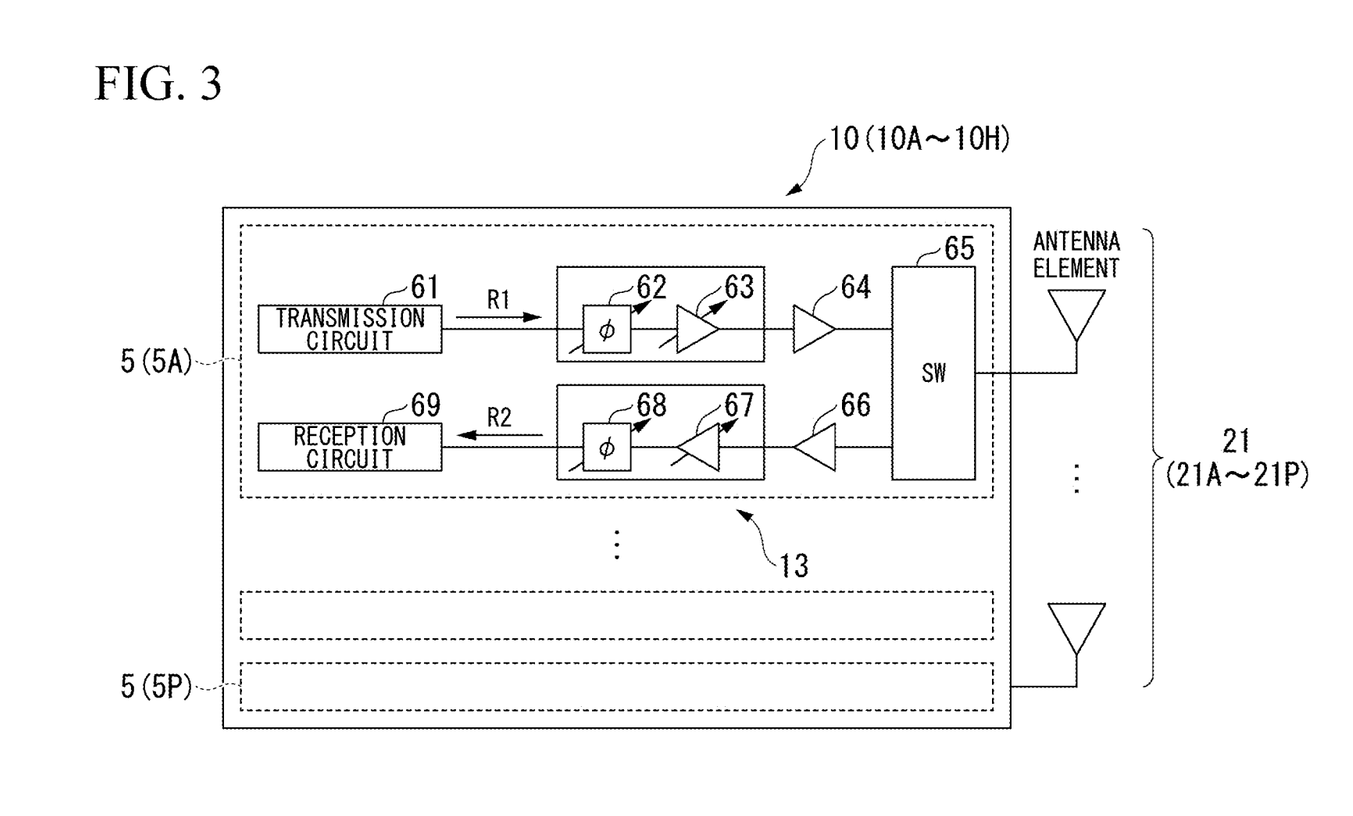
FIG. 3 is a block diagram showing a main configuration of an analog circuit portion provided in an RF front end of the beamformer IC.

FIG. 3 is a block diagram showing a main configuration of an analog circuit portion provided in the RF front end of the beamformer IC. The RF front ends 5A to 5P provided on the beamformer IC 10 have the same configuration. Therefore, in the following description, there is a case where one of the analog circuit portions 13 provided in the 16 RF front ends 5A to 5P, that is, the analog circuit portion 13 provided in the RF front end 5 is described. The description of the analog circuit portions 13 provided in the other 15 RF front ends may be omitted.

As shown in FIG. 3, the analog circuit portion 13 includes a transmission circuit 61, a phase shifter 62, a variable gain amplifier 63, a power amplifier 64, a switch 65, a low noise amplifier 66, a variable gain amplifier 67, a phase shifter 68, and a reception circuit 69.

The transmission circuit 61, the phase shifter 62, the variable gain amplifier 63, and the power amplifier 64 are electrically connected in this order and are provided on a transmission path R1, and the low noise amplifier 66, the variable gain amplifier 67, the phase shifter 68 and the reception circuit 69 are electrically connected in this order and are provided on a reception path R2. The transmission path R1 is a path through which an RF signal output to the antenna element 21 passes, and the reception path R2 is a path through which an RF signal input from the antenna element 21 passes. The switch 65 switches between connecting the transmission path R1 and connecting the reception path R2 to the antenna element 21 at a specified time interval. As a result, the phased array antenna module 1 can transmit and receive a high frequency signal as a time division multiplexing system.

The transmission circuit 61 outputs an RF signal that serves as a source for the RF signal transmitted as the radio wave from the antenna element 21. The phase shifter 62 adjusts the phase shift amount of the RF signal passing through the transmission path R1 according to the phase shift amount setting value in the beam table read from the storage region (not shown) provided in the digital circuit portion 11 shown in FIG. 2. The variable gain amplifier 63 adjusts the intensity of the RF signal passing through the transmission path R1 according to the gain setting value of the beam table read from the above storage region. The power amplifier 64 amplifies the RF signal passing through the transmission path R1 with a predetermined amplification rate. By adjusting the phase shift amount and the intensity of the RF signal passing through the transmission path R1, the beam pattern of the radio wave transmitted from the phased array antenna module 1 can be changed.

The low noise amplifier 66 amplifies the RF signal input from the switch 65 with a predetermined amplification rate. The variable gain amplifier 67 adjusts the intensity of the RF signal passing through the reception path R2 according to the gain setting value of the beam table read from the above storage region. The phase shifter 68 adjusts the phase shift amount of the RF signal passing through the reception path R2 according to the phase shift amount setting value of the beam table read from the storage region. The reception circuit 69 receives the RF signal passing through the reception path R2. By adjusting the phase shift amount and the intensity of the RF signal passing through the reception path R2, the beam pattern of the radio wave received by the phased array antenna module 1 can be changed.

<Main Configuration of Phased Array Antenna Module>

FIG. 4 is a block diagram extracting and summarizing the main configuration of the phased array antenna module according to the first embodiment of the present invention. In FIG. 4, the same reference signs are given to the configuration corresponding to the configuration shown in FIGS. 1 to 3.

As shown in FIG. 4, the main configuration of the phased array antenna module 1 includes the digital circuit portion 11, the strobe mechanism portion 12, the analog circuit portion 13, and the antenna element 21, which are provided in the RF front end 5 shown in FIG. 2. Here, the digital circuit portion 11 includes the interface portion 16, the digital controller 17, the state determination portion 18, and the timing adjustment portion 19.

The interface portion 16 is configured to control an interface of the digital circuit portion 11 with respect to the controller 50, is connected to the controller 50 via a communication bus and performs communication with the controller 50 via the communication bus. The interface portion 16 receives a control command CM transmitted from the controller 50 and outputs the control command CM to the digital controller 17.

When the control command CM transmitted from the controller 50 is received, the interface portion 16 outputs a first busy signal BY1 (for example, a signal of which the signal level is "1") indicating a busy state to the digital controller 17 and the state determination portion 18. When the received control command CM is output to the digital controller 17, the interface portion 16 releases the first busy signal BY1 (for example, sets the signal level of the first busy signal BY1 to "0"). Specifically, the interface portion 16 releases the first busy signal BY1 after one clock at which the writing of the control command CM to a register 17a (details will be described later) of the digital controller 17 is completed. The timing for releasing the first busy signal BY1 may be determined by configuring a state machine inside, or may be a fixed value when the circuit delay is fixed.

The digital controller 17 controls the analog circuit portion 13 by outputting a control signal CS1 corresponding to the control command CM transmitted from the controller 50 to the analog circuit portion 13. The digital controller 17 includes the register 17a and a control circuit 17b. The register 17a temporarily stores the control command CM output from the interface portion 16. The control circuit 17b outputs a control signal corresponding to the control command CM temporarily stored in the register 17a.

For example, the control circuit 17b outputs the control signal CS1 that switches the state (operating state or non-operating state) of the transmission circuit 61 and the reception circuit 69 shown in FIG. 3, corresponding to a control command CM transmitted from the controller 50. In addition, the control circuit 17b outputs the control signal CS1 that causes a predetermined phase shift amount setting value to be set in the phase shifters 62 and 68 shown in FIG. 3 and a predetermined gain setting value to be set in the variable gain amplifiers 63 and 67 shown in FIG. 3, corresponding to the control command CM transmitted from the controller 50.

When the first busy signal BY1 output from the interface portion 16 is input, the control circuit 17b outputs a second busy signal BY2 (for example, a signal of which the signal level is "1") indicating a busy state to the state determination portion 18. The control circuit 17b releases the second busy signal BY2 when the control signal CS1 output to the strobe mechanism portion 12 is fixed (for example, sets the signal level of the second busy signal BY2 to "0"). That is, the control circuit 17b releases the second busy signal BY2 when the input signal of the strobe mechanism portion 12 is fixed. The timing for releasing the second busy signal BY2 may be determined by configuring a state machine inside, or may be a fixed value when the circuit delay is fixed.

The state determination portion 18 determines whether or not the control signal CS1 is in a fixed state. The state determination portion 18 outputs a ready signal RD (determination signal) when it is determined that the control signal CS1 is in the fixed state. The state determination portion 18 determines whether or not the control signal CS1 is in the fixed state, based on the state of the interface portion 16 and the state of the digital controller 17. Specifically, the state determination portion 18 outputs the ready signal RD when the first busy signal BY1 output from the interface portion 16 is released and the second busy signal BY2 output from the control circuit 17b is released. In this manner, the state determination portion 18 makes the determination based on the state of the interface portion 16 and the state of the digital controller 17 in order to determine that the control signal CS1 is in the fixed state in a reliable method.

Figure 5:
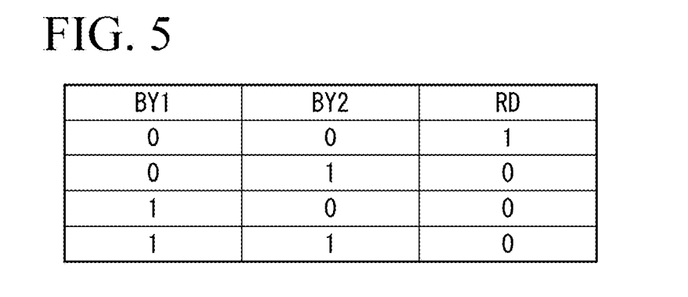
FIG. 5 is a diagram showing an example of a truth table of a state determination portion provided in the phased array antenna module according to the first embodiment of the present invention.

FIG. 5 is a diagram showing an example of a truth table of the state determination portion provided in the phased array antenna module according to the first embodiment of the present invention. As shown in FIG. 5, the state determination portion 18 outputs the ready signal RD of which the signal level is "1" when the signal levels of both the first busy signal BY1 output from the interface portion 16 and the second busy signal BY2 output from the control circuit 17b are "0". As a case where the signal levels of both the first busy signal BY1 and the second busy signal BY2 are "0", a case where both the first busy signal BY1 and the second busy signal BY2 are released is an exemplary example.

On the other hand, the state determination portion 18 sets the signal level of the ready signal RD to "0" when the signal level of at least one of the first busy signal BY1 output from the interface portion 16 and the second busy signal BY2 output from the control circuit 17b is "1". That is, when at least one of the first busy signal BY1 output from the interface portion 16 and the second busy signal BY2 output from the control circuit 17b indicates a busy state, the state determination portion 18 sets the signal level of the ready signal RD to "0".

The timing adjustment portion 19 is for adjusting a timing of inputting a strobe latch signal SL1 output from the controller 50 to the strobe mechanism portion 12. Here, the strobe latch signal SL1 is an instruction signal that instructs the strobe mechanism portion 12 to perform a strobe latch operation. The timing adjustment portion 19 outputs the strobe latch signal SL1 as the strobe latch signal SL2 to the strobe mechanism portion 12 when the strobe latch signal SL1 output from the controller 50 is input and the ready signal RD is output from the state determination portion 18. The timing adjustment portion 19 is realized by an AND circuit 19a, for example, as shown in FIG. 4.

The strobe latch signal SL1 may be implemented as one of the control commands CM transmitted through a communication bus that connects the controller 50 to the interface portion 16 and may be implemented as a signal transmitted through a signal line different from the communication bus. In the present embodiment, it is assumed that the strobe latch signal SL1 is implemented as a signal transmitted through a signal line different from the communication bus.

<Operation of Main Configuration in Phased Array Antenna Module>

Figure 6:
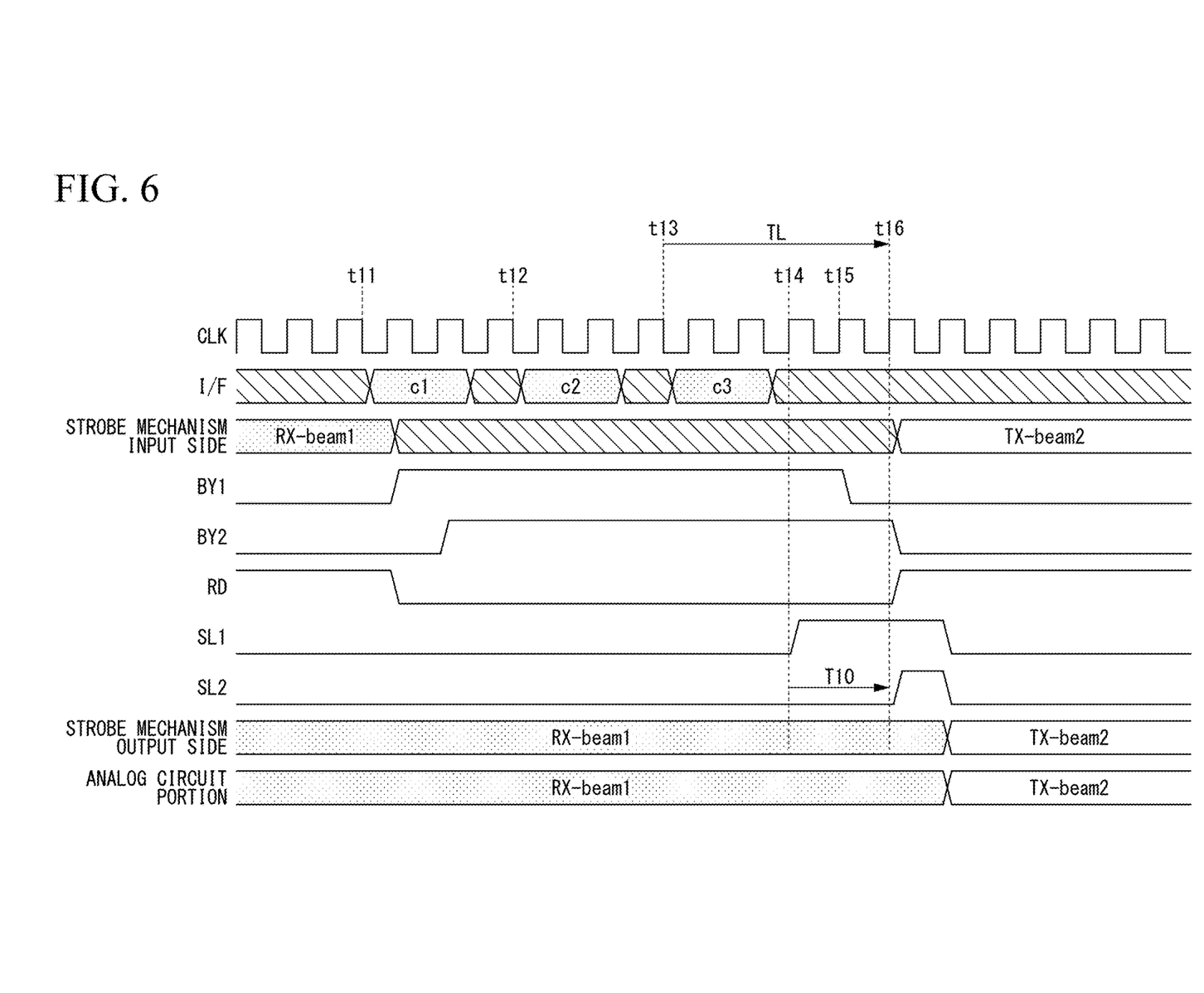
FIG. 6 is a timing chart for describing an operation of the main configuration of the phased array antenna module shown in FIG. 4.

FIG. 6 is a timing chart for describing the operation of the main configuration of the phased array antenna module shown in FIG. 4. The timing chart shown in FIG. 6 shows an operation of switching from a beam pattern (RX-beam1) for reception (RX) of the phased array antenna module 1 to a beam pattern (TX-beam2) for transmission (TX).

In FIG. 6, a clock CLK is an operation clock of the phased array antenna module 1 shown in FIG. 4. That is, the main configuration of the phased array antenna module 1 shown in FIG. 4 operates in synchronization with the clock CLK shown in FIG. 6. "I/F" indicates a state of the interface portion 16 in FIG. 4. The "strobe mechanism input side" indicates a state of a stage in input side of the strobe mechanism portion 12 of the phased array antenna module 1, and the "strobe mechanism output side" indicates a state of a stage in output side of the strobe mechanism portion 12 of the phased array antenna module 1. The "analog circuit portion" indicates a state of the analog circuit portion 13 shown in FIG. 4.

In addition, "BY1" in FIG. 6 indicates the first busy signal BY1 output from the interface portion 16, and "BY2" indicates the second busy signal BY2 output from the control circuit 17b. "RD" indicates the ready signal RD output from the state determination portion 18. "SL1" indicates the strobe latch signal SL1 output from the controller 50, and "SL2" indicates the strobe latch signal SL2 output from the timing adjustment portion 19.

In the present embodiment, in order to switch the beam pattern of the phased array antenna module 1, the three instructions c1, c2, and c3 are sequentially output as the control command CM from the controller 50 to the phased array antenna module 1 and are input to the interface portion 16. The instruction c1 is an instruction for bringing the reception circuit 69 shown in FIG. 3 into a non-operating state (off state), the instruction c2 is an instruction for bringing the transmission circuit 61 shown in FIG. 3 into an operating state (on state), and the instruction c3 is an instruction for switching from a beam pattern for reception to a beam pattern for transmission. The times when the instructions c1, c2, and c3 are each received by the interface portion 16 are times t11, t12, and t13.

The instruction c1 for turning the reception circuit 69 shown in FIG. 3 into a non-operating state (off state) is input to the interface portion 16 (time t11), and the interface portion 16 outputs the first busy signal BY1 indicating a busy state at a rise of the subsequent clock CLK. As a result, as shown in FIG. 6, the signal level of the first busy signal BY1 is changed from "0" to "1".

The first busy signal BY1 indicating the busy state output from the interface portion 16 is input to the digital controller 17 and the state determination portion 18. Then, the signal level of the ready signal RD output from the state determination portion 18 is changed from "1" to "0". In addition, the control circuit 17b of the digital controller 17 outputs the second busy signal BY2 indicating a busy state. As a result, as shown in FIG. 6, the signal level of the second busy signal BY2 is changed from "0" to "1".

Thereafter, the instruction c2 for turning the transmission circuit 61 shown in FIG. 3 into an operating state (on state) is input to the interface portion 16 (time t12), and the instruction c3 for switching from a beam pattern for reception to a beam pattern for transmission is input to the interface portion 16 (time t13). After the transmission of a control command CM (the instructions c1, c2, and c3) is ended, the strobe latch signal SL1 is output from the controller 50 at a rise of the subsequent clock CLK (time t14).

Here, when the writing of the instruction c3 into the register 17a of the digital controller 17 by the interface portion 16 is completed, the first busy signal BY1 is released by the interface portion 16 after one clock. As a result, as shown in FIG. 6, the signal level of the first busy signal BY1 is changed from "1" to "0" (time t15). In addition, when the instruction c3 written in the register 17a is read by the control circuit 17b, the control signal CS1 output to the strobe mechanism portion 12 is fixed, so that the second busy signal BY2 is released by the control circuit 17b. As a result, as shown in FIG. 6, the signal level of the second busy signal BY2 is changed from "1" to "0" (time t16). The fixed control signal CS1 corresponds to the instructions c1, c2, and c3 described above.

Since both the first busy signal BY1 and the second busy signal BY2 are released, the state determination portion 18 outputs the ready signal RD, and as shown in FIG. 6, the signal level of the ready signal RD is changed from "0" to "1" (the time t16). As a result, the strobe latch signal SL1 is output as the strobe latch signal SL2 from the timing adjustment portion 19 to the strobe mechanism portion 12 (the time t16), and the control signal CS1 output from the control circuit 17b is latched to the strobe mechanism portion 12 and is output to the analog circuit portion 13.

Then, in the output side (including the analog circuit portion 13) of the strobe mechanism portion 12 of the phased array antenna module 1, the beam pattern (RX-beam1) for reception (RX) is immediately switched to the beam pattern (TX-beam2) for transmission (TX). As a result, the time from the transmission start to the transmission end of the control command CM (the instructions c1, c2, and c3) can be excluded from the transition time TR required for switching the beam pattern, and the transition time TR required for switching the beam pattern is determined only by the response speed of the analog circuit portion 13. In FIG. 6, the response speed of the analog circuit portion 13 is set to "0" in order to simplify the description.

In this manner, in the present embodiment, the strobe mechanism portion 12 is provided between the digital circuit portion 11 and the analog circuit portion 13. Then, the strobe mechanism portion 12 latches the control signal CS1 at the timing (the time t16) at which the control signal CS1 is fixed. As a result, the time from the transmission start to the transmission end of the control command CM (the instructions c1, c2, and c3) can be excluded from the transition time TR required for switching the beam pattern, and the transition time TR required for switching the beam pattern can be shortened.

Here, a time until the control signal CS1 output to the strobe mechanism portion 12 is fixed after the controller 50 transmits the control command CM is defined as a lead time TL. In the example shown in FIG. 6, the lead time TL is a time corresponding to 4.5 periods of the clock CLK. The lead time TL includes a time required for command processing in the interface portion 16, a delay time in the control circuit 17b, and a time required for read processing of the beam table (look-up table) from the storage region (not shown) provided in the digital circuit portion 11. In the present embodiment, since the lead time TL can be excluded from the transition time TR, the transition time TR can be shortened.

In addition, in the present embodiment, the state determination portion 18 and the timing adjustment portion 19 are provided. Then, when it is determined whether or not the control signal CS1 is in the fixed state, and the determination result indicates that the control signal CS1 is in the fixed state, the strobe latch signal SL2 is output to the strobe mechanism portion 12. That is, as shown in FIG. 6, the timing is adjusted such that, after the strobe latch signal SL1 is output from the controller 50, a time T10 has elapsed, and then the strobe latch signal SL1 is input to the strobe mechanism portion 12 as the strobe latch signal SL2.

As a result, although the controller 50 outputs the strobe latch signal SL1 before the timing (the time t16) at which the control signal CS1 is fixed (that is, before the lead time TL shown in FIG. 6 elapses), the control signal CS1 is latched to the strobe mechanism portion 12 at the timing (the time t16) at which the control signal CS1 is fixed. Therefore, it is possible to eliminate restrictions on the timing at which the controller 50 transmits the strobe latch signal.

Second Embodiment

<Main Configuration of Phased Array Antenna Module>

Figure 7:
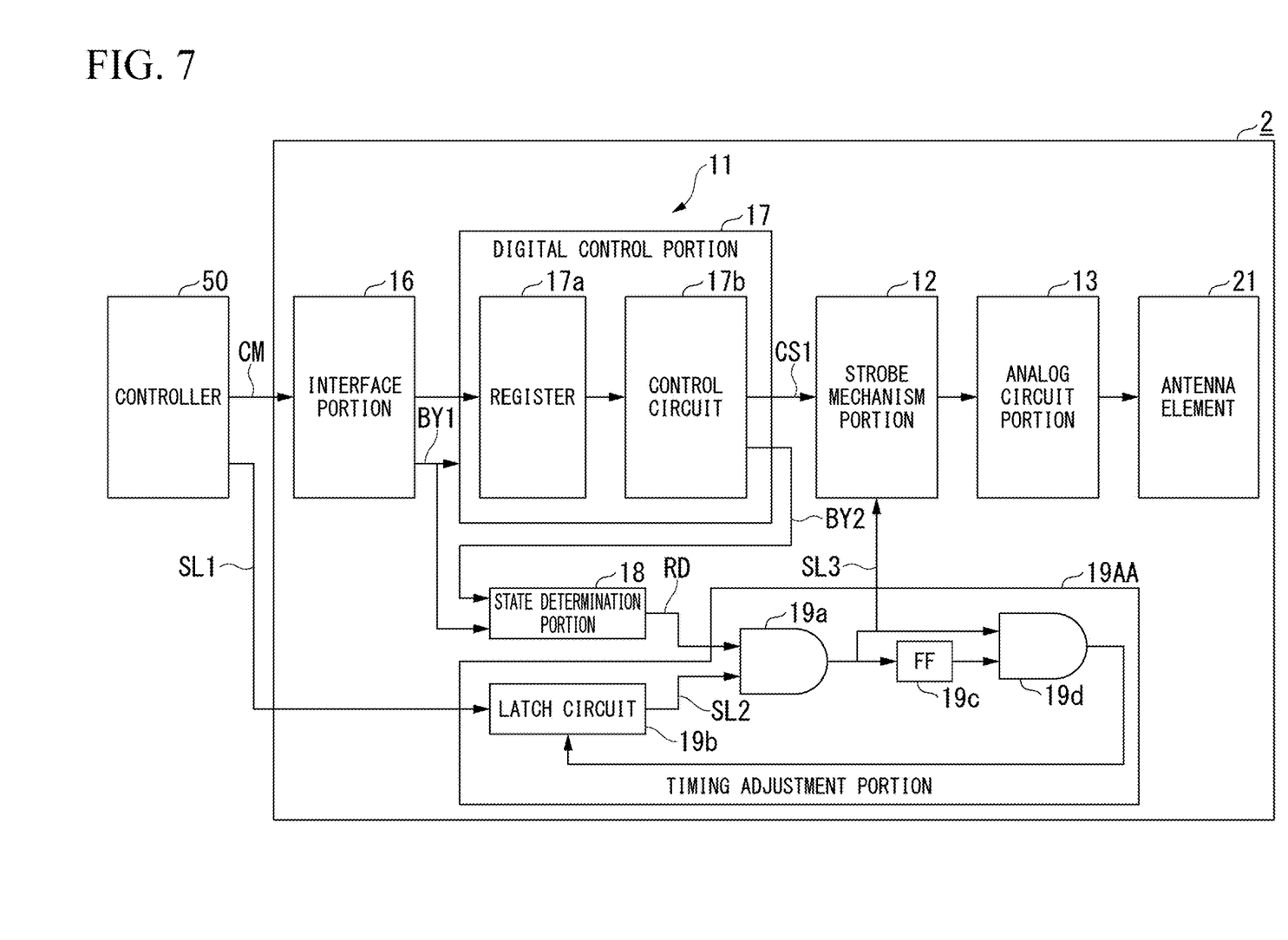
FIG. 7 is a block diagram extracting and summarizing a main configuration of a phased array antenna module according to a second embodiment of the present invention.

FIG. 7 is a block diagram extracting and summarizing a main configuration of a phased array antenna module according to the second embodiment of the present invention. In FIG. 7, the same reference signs are given to the configuration corresponding to the configuration shown in FIG. 4. As shown in FIG. 7, a phased array antenna module 2 of the present embodiment has a configuration in which a timing adjustment portion 19AA is provided instead of the timing adjustment portion 19 included in the phased array antenna module 1 of the first embodiment.

In the phased array antenna module 2 of the present embodiment, although the output of the strobe latch signal SL1 is stopped before the timing at which the control signal CS1 is fixed, the switching of the beam pattern can be performed normally. The basic configuration of the phased array antenna module 2 according to the present embodiment is the same as that of the phased array antenna module 1 shown in FIG. 1. In addition, the basic configuration of the beamformer IC 10 provided in the phased array antenna module 2 according to the present embodiment is the same as that of the beamformer IC 10 shown in FIG. 2.

As shown in FIG. 7, the timing adjustment portion 19AA includes a latch circuit 19b, a flip flop 19c, and an AND circuit 19d in addition to the AND circuit 19a. The latch circuit 19b is a circuit that holds (latches) the strobe latch signal SL1 output from the controller 50 and outputs as the strobe latch signal SL2. The latch circuit 19b is reset by being input with the output of the AND circuit 19d.

The output end of the latch circuit 19b is connected to one input end of the AND circuit 19a. The output end of the state determination portion 18 is connected to the other input end of the AND circuit 19a. The AND circuit 19a outputs the strobe latch signal SL2 as a strobe latch signal SL3 to the strobe mechanism portion 12 when the strobe latch signal SL2 is output from the latch circuit 19b and the ready signal RD is output from the state determination portion 18.

The flip flop 19c is, for example, a D flip flop, and is provided to delay the strobe latch signal SL3 output from the AND circuit 19a by one period of the clock CLK. The AND circuit 19d is a circuit that calculates a logical conjunction of the strobe latch signal SL3 output from the AND circuit 19a and the output of the flip flop 19c. Specifically, the AND circuit 19d outputs a signal of which the signal level is "1" when both the signal levels of the strobe latch signal SL3 output from the AND circuit 19a and the output of the flip flop 19c are "1". The signal level of the output of the AND circuit 19d is "0" when at least one of the signal levels of the strobe latch signal SL3 output from the AND circuit 19a and the output of the flip flop 19c is "0".

<Operation of Main Configuration in Phased Array Antenna Module>

Figure 8:
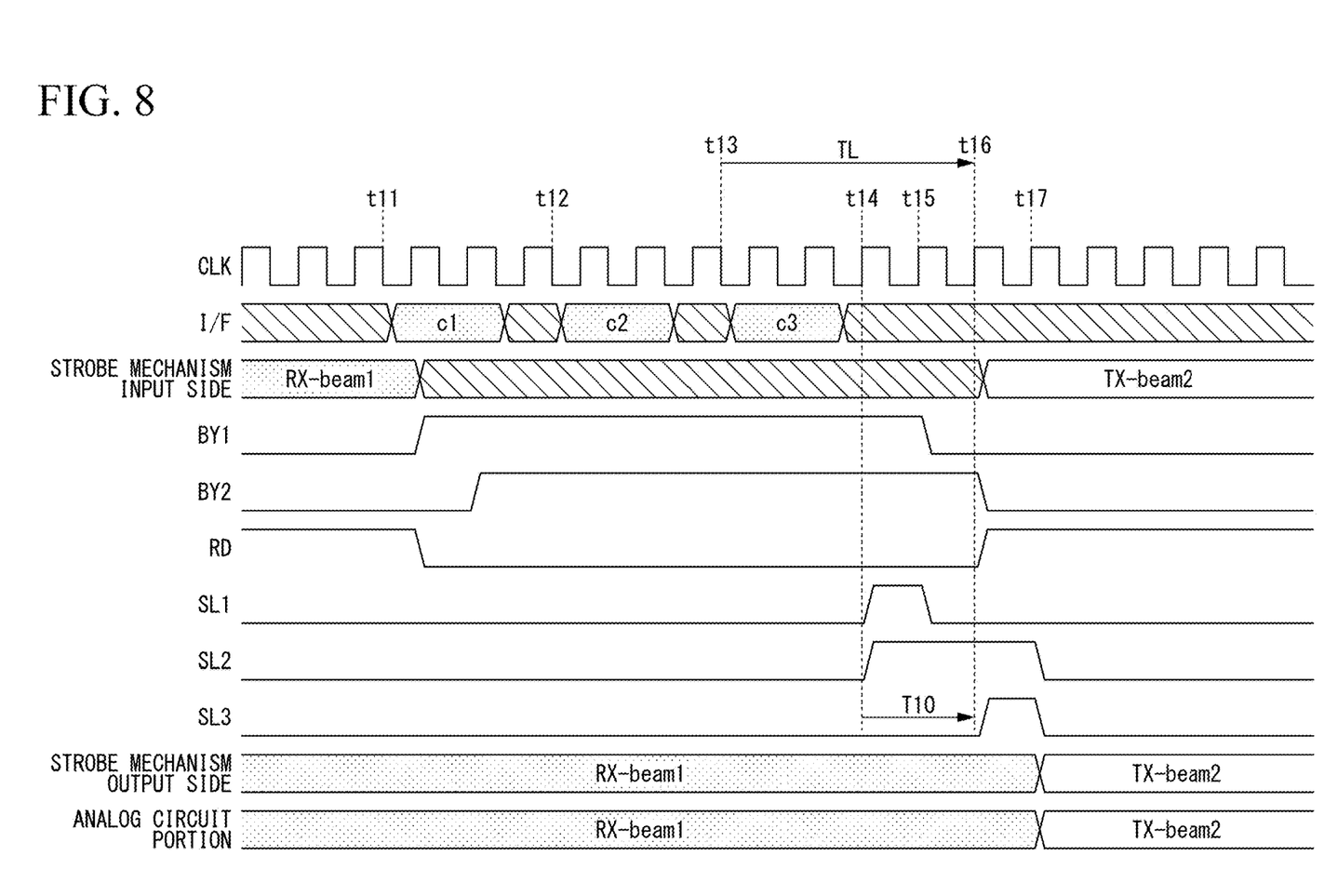
FIG. 8 is a timing chart for describing an operation of the main configuration of the phased array antenna module shown in FIG. 7.

FIG. 8 is a timing chart for describing the operation of the main configuration of the phased array antenna module shown in FIG. 7. The timing chart shown in FIG. 8, similarly to the timing chart shown in FIG. 6, shows an operation of switching from the beam pattern (RX-beam1) for reception (RX) of the phased array antenna module 2 to the beam pattern (TX-beam2) for transmission (TX).

"SL1" in FIG. 8 indicates the strobe latch signal SL1 output from the controller 50, as in the case of "SL1" in FIG. 6. "SL2" in FIG. 8 indicates the strobe latch signal SL2 output from the latch circuit 19b, and "SL3" indicates the strobe latch signal SL3 output from the AND circuit 19a.

Also in the present embodiment, in order to switch the beam pattern of the phased array antenna module 2, the three instructions c1, c2, and c3 are sequentially output as the control command CM from the controller 50 to the phased array antenna module 2 and are input to the interface portion 16. Since an operation until the three instructions c1, c2, and c3 are input to the interface portion 16 (until the time t13) is the same as that of the first embodiment, the description thereof will be omitted.

After the transmission of a control command CM (the instructions c1, c2, and c3) is ended, the strobe latch signal SL1 is output from the controller 50 at the time of a rise of the subsequent clock CLK (the time t14). In the present embodiment, the strobe latch signal SL1 is output at the same timing as in the first embodiment, but a period during which the signal level is "1" is only one cycle of the clock CLK. Therefore, as shown in FIG. 8, the signal level of the strobe latch signal SL1 is "O" before the time t16 at which the control signal CS1 is fixed.

The strobe latch signal SL1 output from the controller 50 is latched by the latch circuit 19b. As a result, the strobe latch signal SL2 is output from the latch circuit 19b. Here, it should be noted that, as shown in FIG. 8, the signal level of the strobe latch signal SL2 is "1" although the signal level of the strobe latch signal SL1 is "O" and the time t16 elapses.

When the writing of the instruction c3 into the register 17a of the digital controller 17 by the interface portion 16 is completed, as in the first embodiment, the first busy signal BY1 is released by the interface portion 16 after one clock. As a result, as shown in FIG. 8, the signal level of the first busy signal BY1 is changed from "1" to "0" (the time t15). In addition, when the instruction c3 written in the register 17a is read by the control circuit 17b, the control signal CS1 output to the strobe mechanism portion 12 is fixed, so that the second busy signal BY2 is released by the control circuit 17b. As a result, as shown in FIG. 8, the signal level of the second busy signal BY2 is changed from "1" to "0" (the time t16). The fixed control signal CS1 corresponds to the instructions c1, c2, and c3 described above.

Since both the first busy signal BY1 and the second busy signal BY2 are released, the state determination portion 18 outputs the ready signal RD, and as shown in FIG. 8, the signal level of the ready signal RD is changed from "0" to "1" (the time t16). As a result, the strobe latch signal SL2 is output as the strobe latch signal SL3 from the AND circuit 19a to the strobe mechanism portion 12, and the control signal CS1 output from the control circuit 17b is latched to the strobe mechanism portion 12 and is output to the analog circuit portion 13.

Then, in the output side (including the analog circuit portion 13) of the strobe mechanism portion 12 of the phased array antenna module 2, the beam pattern (RX-beam1) for reception (RX) is immediately switched to the beam pattern (TX-beam2) for transmission (TX). As a result, the time from the transmission start to the transmission end of the control command CM (the instructions c1, c2, and c3) can be excluded from the transition time TR required for switching the beam pattern, and the transition time TR required for switching the beam pattern is determined only by the response speed of the analog circuit portion 13. In FIG. 8, as in FIG. 6, the response speed of the analog circuit portion 13 is set to "0" in order to simplify the description.

The strobe latch signal SL3 output from the AND circuit 19a is also output to the flip flop 19c. The flip flop 19c delays the input strobe latch signal SL3 by one period of the clock CLK and outputs the signal. Therefore, the signal level of the output of the AND circuit 19d is changed from "0" to "1" at time t17, and the latch circuit 19b is reset. Accordingly, the signal level of the strobe latch signal SL3 is changed from "1" to "0" at the time t17.

In this manner, also in the present embodiment, the strobe mechanism portion 12 is provided between the digital circuit portion 11 and the analog circuit portion 13. Then, the strobe mechanism portion 12 latches the control signal CS1 at the timing (the time t16) at which the control signal CS1 is fixed. As a result, the time (the lead time TL) from the transmission start to the transmission end of the control command CM (the instructions c1, c2, and c3) can be excluded from the transition time TR required for switching the beam pattern, and the transition time TR required for switching the beam pattern can be shortened.

In addition, in the present embodiment, the state determination portion 18 and the timing adjustment portion 19AA are provided. Then, when it is determined whether or not the control signal CS1 is in the fixed state, and the determination result indicates that the control signal CS1 is in the fixed state, the strobe latch signal SL3 is output to the strobe mechanism portion 12. That is, as shown in FIG. 8, the timing is adjusted such that, after the strobe latch signal SL1 is output from the controller 50, the time T10 has elapsed, and then the strobe latch signal SL3 is input to the strobe mechanism portion 12.

As a result, although the controller 50 outputs the strobe latch signal SL1 before the timing (the time t16) at which the control signal CS1 is fixed (that is, before the lead time TL shown in FIG. 8 elapses), the control signal CS1 is latched to the strobe mechanism portion 12 at the timing (the time t16) at which the control signal CS1 is fixed. Therefore, it is possible to eliminate restrictions on the timing at which the controller 50 transmits the strobe latch signal.

Furthermore, in the present embodiment, the timing adjustment portion 19AA is provided with the latch circuit 19b and the flip flop 19c. Then, the strobe latch signal SL1 output from the controller 50 is latched by the latch circuit 19b, and when the control signal CS1 is in the fixed state, the strobe latch signal SL3 is output to the strobe mechanism portion 12. In addition, when both the signal levels of the strobe latch signal SL3 and the strobe latch signal SL3 delayed by one period of the clock CLK by the flip flop 19c are "1", the latch circuit 19b is reset. As a result, for example, although it takes a time for the control signal CS1 to be fixed and the signal level of the strobe latch signal SL1 is "0" before the time t16 at which the control signal CS1 is fixed, the switching of the beam pattern can be performed normally.

Although the phased array antenna module according to the embodiments of the present invention has been described above, the present invention is not limited to the above embodiments and can be freely changed within the scope of the present invention. For example, the phased array antenna module described in the above embodiment is for a time division multiplexing system. However, the phased array antenna module of the present invention may be for a frequency division multiplexing system.

In addition, in the above-described embodiment, an example has been described in which the one antenna element 21 is connected to the one RF front end 5 on a one-to-one correspondence. However, in the present invention, two front ends may be connected to a dual polarization antenna element having a connection terminal for horizontal polarization and a connection terminal for vertical polarization.

What is claimed is:
1. A phased array antenna module comprising:
   an analog circuit portion configured to adjust at least one of an intensity and a phase of a signal transmitted or received by each of a plurality of antenna elements;
   a digital control portion configured to control the analog circuit portion;

a strobe mechanism portion that is provided between the analog circuit portion and the digital control portion, and configured to latch a control signal output from the digital control portion when an instruction signal indicating a strobe latch operation is input and to output the control signal to the analog circuit portion;

a state determination portion configured to determine whether or not the control signal is in a fixed state; and a timing adjustment portion configured to output the instruction signal to the strobe mechanism portion when the instruction signal is input and a determination signal output from the state determination portion indicates that the control signal is in a fixed state.

2. The phased array antenna module according to claim 1, further comprising:

an interface portion configured to receive a control command transmitted from an outside, and to output the control command to the digital control portion, wherein the state determination portion determines whether or not the control signal is in a fixed state, based on a state of the interface portion and a state of the digital control portion.

3. The phased array antenna module according to claim 2, wherein the interface portion outputs a first busy signal indicating a busy state when the control command is received, and releases the first busy signal when a process of outputting the control command to the digital control portion is completed, the digital control portion outputs a second busy signal indicating a busy state when the first busy signal output from the interface portion is input, and releases the second busy signal when the control signal is in a fixed state, and the state determination portion determines that the control signal is in a fixed state, when both the first busy signal and the second busy signal are released.

4. The phased array antenna module according to claim 1, wherein the timing adjustment portion includes a latch circuit that latches the instruction signal, and outputs the instruction signal latched by the latch circuit to the strobe mechanism portion when the determination signal output from the state determination portion indicates that the control signal is in a fixed state.

5. The phased array antenna module according to claim 4, wherein the timing adjustment portion outputs the instruction signal latched by the latch circuit to the strobe mechanism portion, and then clears the latch circuit.

6. The phased array antenna module according to claim 2, wherein the timing adjustment portion includes a latch circuit that latches the instruction signal, and outputs the instruction signal latched by the latch circuit to the strobe mechanism portion when the determination signal output from the state determination portion indicates that the control signal is in a fixed state.

7. The phased array antenna module according to claim 3, wherein the timing adjustment portion includes a latch circuit that latches the instruction signal, and outputs the instruction signal latched by the latch circuit to the strobe mechanism portion when the determination signal output from the state determination portion indicates that the control signal is in a fixed state.

8. The phased array antenna module according to claim 6, wherein the timing adjustment portion outputs the instruction signal latched by the latch circuit to the strobe mechanism portion, and then clears the latch circuit.

9. The phased array antenna module according to claim 7, wherein the timing adjustment portion outputs the instruction signal latched by the latch circuit to the strobe mechanism portion, and then clears the latch circuit.

* * * * *